J. H. ESDERS.
VEHICLE WHEEL.
APPLICATION FILED DEC. 30, 1908.
971,434.
Patented Sept. 27, 1910.
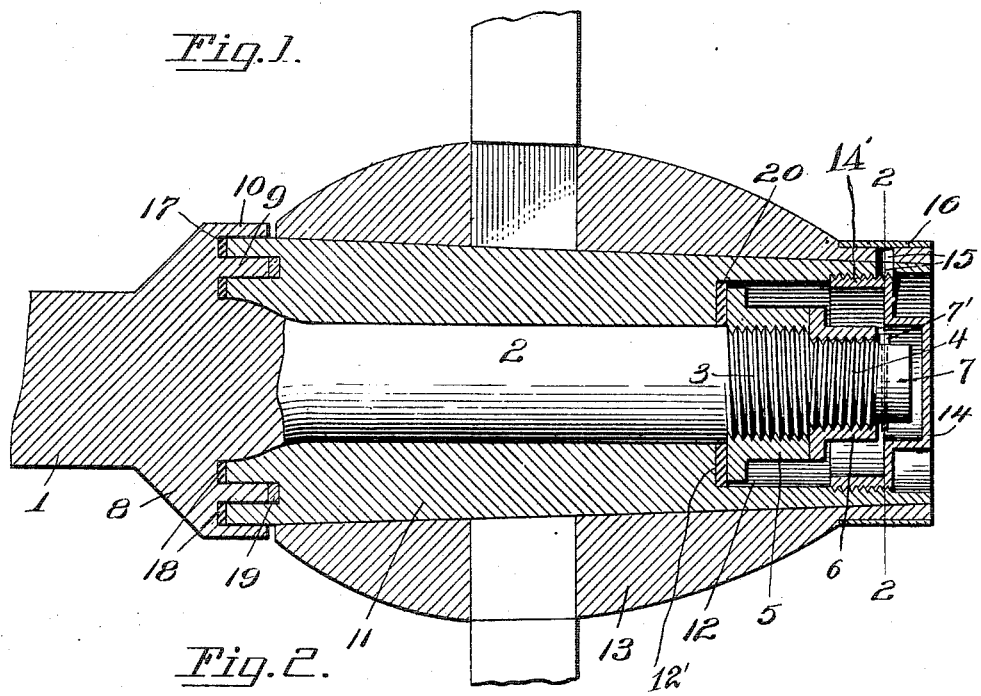
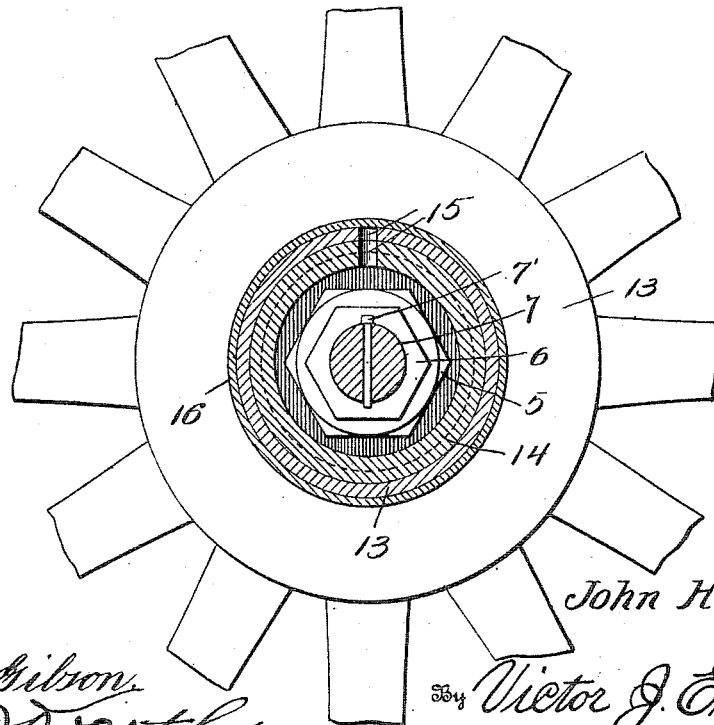
Witnesses
F. C. Gibson
Wm. J. Worth
Inventor
John H. Esders.
By Victor J. Evans
Attorney

UNITED STATES PATENT OFFICE.

JOHN H. ESDERS, OF ST. JOSEPH, MISSOURI.

VEHICLE-WHEEL.

971,434.  Specification of Letters Patent. Patented Sept. 27, 1910.

Application filed December 30, 1908. Serial No. 470,040.

*To all whom it may concern:*

Be it known that I, JOHN H. ESDERS, a citizen of the United States, residing at St. Joseph, in the county of Buchanan and State of Missouri, have invented new and useful Improvements in Vehicle-Wheels, of which the following is a specification.

This invention relates to improvements in mounting the wheels of carriages and other vehicles, and resides in the novel construction and combination of elements hereinafter fully described and claimed.

In the drawings, Figure 1 is a longitudinal section of the hub or nave of a wheel constructed in accordance with the present invention. Fig. 2 is a transverse sectional view upon the line 2—2 of Fig. 1.

In the accompanying drawing the numeral 1 designates an axle of the ordinary construction. This axle 1 is provided with the usual spindle 2 which in this instance has its outer ends provided with oppositely threaded members 3 and 4 which are adapted for the reception of suitable nuts 5 and 6. The spindle is also provided with a smooth surfaced extremity or portion 7 beyond the threaded portions, which extremity has a suitable opening adapted for the reception of a pin 7' which bears against the outer nut 6 and effectively locks the nuts upon the spindle.

The axle 1 adjacent its point of connection with the spindle 2 is provided with an enlargement 8 and this enlargement is preferably cylindrical in cross section and is provided with spaced annular flanges 9 and 10.

The numeral 11 designates the boxing of the hub. This boxing 11 is provided with a central bore corresponding with the cross sectional contour of the spindle 2 and is also provided with an enlarged flaring chamber 12 which extends longitudinally from a point inwardly of the portion of the spindle provided with the threads to the outer end of the hub 13 and has its inner wall smooth surfaced to form a shoulder 12'. The chamber 12 is internally threaded near its outer end for the reception of coacting external threads provided upon the offset or enlarged portion 14' of a cap 14. The boxing 11 and hub 13 are provided with registering transverse openings 15' which are normally covered by a slidable metallic band or collar 16 and the portion 14' of the cap, and these openings are adapted to be alined with the pin 7' providing a means whereby, when the cap 14 is removed, the pin 7' may be readily inserted within the opening provided by the projecting portion of the spindle 2. The outer portion of the cap nut forms a head or cap of reduced diameter relative to the portion 14' to receive the spindle portion 7.

The boxing 11 is provided upon its rear face with an annular groove or cut away portion 17, and this cut away portion or groove is adapted for the annular offset portion 9 of the enlargement 8 provided by the axle 1, while the annular offset portion 10 is adapted to engage and surround the outer extending portion of the boxing 11, as clearly illustrated in Fig. 1 of the drawing. The spaces between the annular offset 9, the spindle 2 and the offset 10 are adapted for the reception of suitable leather washers 18, while the inner face provided by the cut away portions 17 of the boxing 11 is adapted for the reception of a washer constructed of sponge or other absorbent material designated by the numeral 19.

From the above description taken in connection with the accompanying drawing it will be noted that I have provided a comparatively simple and inexpensive device for the purpose set forth, one which provides an effective lubricant chamber whereby the said lubricant may be at all times fed between the spindle and the boxing of the hub, and one wherein the meeting faces of the enlarged portion of the axle and the boxing are so constructed as to provide interlocking tongues and having the spaces between said tongues provided with suitable washers which will effectively prevent the outlet of the lubricant as well as effectively preventing the entrance of dust or grit between the spindle and the boxing.

It will be noted by reference to Fig. 1 of the drawing that the space between the nut 5 and the face of the chamber 12 is occupied by an absorbent washer 20, which washer is clamped by the nut 5 against the shoulder 12'. By this arrangement it will be understood that the lubricant within the chamber 12 may be readily fed to the spindle 2.

Having thus fully described the invention what is claimed as new is:

In a vehicle wheel, an axle provided with a spindle having at its outer end reversely threaded portions and a smooth surfaced extremity progressively reduced in diameter in stepped relation, an axle having a transverse opening in one side at its outer end and provided with a box journaled on the spindle, the outer end of said box being formed with a flaring chamber having a coinciding transverse opening and an internally threaded portion, said chamber extending inwardly beyond the innermost threaded portion of the spindle and having its inner wall forming a plane annular shoulder, a gasket bearing against said shoulder and surrounding the adjacent portion of the body of the spindle, a nut engaging the inner larger threaded portion of the spindle and bearing against the gasket, a second nut engaging the outer and smaller reversely threaded portion of the spindle and bearing against the first-named nut, a transverse pin removably fitted in the outer smooth surfaced end of the spindle to retain said nut in position, said pin being arranged for alinement with the transverse openings in the axle and box, a cap nut having an enlarged externally threaded portion engaging the threaded portion of the chamber and inclosing the outer nut and a hollow head or cap portion of reduced diameter inclosing the said smooth surfaced extremity of the spindle, said cap nut being arranged to close the transverse opening in the box, and a sliding band inclosing the outer end of the hub and closing the transverse opening therein.

In testimony whereof I affix my signature in presence of two witnesses.

JOHN H. ESDERS.

Witnesses:
   M. L. KULLMANN,
   W. J. WILLIAMS.